(12) United States Patent
Chu et al.

(10) Patent No.: US 11,365,890 B2
(45) Date of Patent: Jun. 21, 2022

(54) COOKER HOOD, AND METHOD AND SYSTEM FOR CONTROLLING SAME

(71) Applicant: BSH Hausgeräte GmbH, Munich (DE)

(72) Inventors: Dongyu Chu, Zhaozhuang (CN); Hongcai He, Nanjing (CN); Peter Schlotmann, Bretten (DE); Lei Yang, Nanjing (CN); Kuang Shen, Nanjing (CN); Kai Xu, Nanjing (CN)

(73) Assignee: BSH Hausgeräte GmbH, Munich (DE)

( * ) Notice: Subject to any disclaimer, the term of this patent is extended or adjusted under 35 U.S.C. 154(b) by 7 days.

(21) Appl. No.: 16/490,925

(22) PCT Filed: Feb. 28, 2018

(86) PCT No.: PCT/IB2018/051264
§ 371 (c)(1),
(2) Date: Sep. 4, 2019

(87) PCT Pub. No.: WO2018/163024
PCT Pub. Date: Sep. 13, 2018

(65) Prior Publication Data
US 2020/0011540 A1   Jan. 9, 2020

(30) Foreign Application Priority Data

Mar. 8, 2017  (CN) .......................... 201710135293.7

(51) Int. Cl.
*F24C 15/00* (2006.01)
*F24C 15/20* (2006.01)
*G06T 7/00* (2017.01)

(52) U.S. Cl.
CPC ............... *F24C 15/20* (2013.01); *G06T 7/00* (2013.01)

(58) Field of Classification Search
CPC ......... F24C 15/2021; F24C 15/20; G06T 7/00
See application file for complete search history.

(56) References Cited

U.S. PATENT DOCUMENTS 2,912,919 A  * 11/1959 Bernstein ................ F24C 15/20
  126/299 D
6,920,874 B1 *  7/2005 Siegel .................. F24C 15/2021
  126/21 A
(Continued)

FOREIGN PATENT DOCUMENTS

| CN | 105526614 A | 4/2016 |
|---|---|---|
| CN | 205447921 U | 8/2016 |

(Continued)

OTHER PUBLICATIONS

International Searcg Report PCT/IB2018/051264 dated May 18, 2018.
Report of Examination EP 18711692.6 dated Jun. 22, 2021.

*Primary Examiner* — Alfred Basichas
(74) *Attorney, Agent, or Firm* — Michael E. Tschupp; Andre Pallapies; Brandon G. Braun

(57) ABSTRACT

A cooker hood, and a method and system for controlling same are provided. An image collection apparatus is disposed on the cooker hood. The control method includes: when a menu production start instruction is received, controlling the image collection apparatus to perform an image collection operation; storing a collected image; and after a menu production end instruction is received, invoking the collected image, to generate a corresponding menu. By means of the foregoing solutions, user operations in a menu production process can be simplified.

19 Claims, 3 Drawing Sheets

(56) References Cited

U.S. PATENT DOCUMENTS

| | | | |
|---|---|---|---|
| 10,670,278 B2* | 6/2020 | Ji | F24C 7/087 |
| 2006/0278216 A1* | 12/2006 | Gagas | F24C 15/2028 |
| | | | 126/299 D |
| 2009/0048714 A1* | 2/2009 | Hanawalt | F24C 15/2021 |
| | | | 700/275 |
| 2010/0051011 A1* | 3/2010 | Shaffer | F24C 15/20 |
| | | | 126/299 D |
| 2010/0297928 A1* | 11/2010 | So | F24F 7/06 |
| | | | 454/341 |
| 2011/0132201 A1 | 6/2011 | Richardson et al. | |
| 2013/0171304 A1* | 7/2013 | Huntley | G06Q 50/00 |
| | | | 426/231 |
| 2014/0234496 A1* | 8/2014 | Siegel | F23N 5/242 |
| | | | 426/231 |
| 2015/0119003 A1 | 4/2015 | Park et al. | |
| 2017/0170978 A1 | 6/2017 | Luckhardt et al. | |
| 2018/0238555 A1* | 8/2018 | Serabatir | F24C 15/2021 |
| 2019/0301748 A1* | 10/2019 | Milani | F24C 15/2021 |
| 2021/0035462 A1* | 2/2021 | Drake | G09B 5/065 |
| 2021/0035463 A1* | 2/2021 | Drake | G09B 5/125 |

FOREIGN PATENT DOCUMENTS

| | | |
|---|---|---|
| CN | 205957260 U | 2/2017 |
| CN | 107449005 A | 12/2017 |
| DE | 102013206340 A1 | 10/2014 |

\* cited by examiner

COOKER HOOD, AND METHOD AND SYSTEM FOR CONTROLLING SAME

CROSS-REFERENCES TO RELATED APPLICATIONS

This application is the U.S. National Stage of International Application No. PCT/IB2018/051264, filed Feb. 28, 2018, which designated the United States and has been published as International Publication No. WO 2018/163024 A1 and which claims the priority of Chinese Patent Application, Serial No. 201710135293.8, filed Mar. 8, 2017, pursuant to 35 U.S.C. 119(a)-(d).

BACKGROUND

Technical Field

The present invention relates to the field of household appliance technologies, and specifically, to a cooker hood, and a method and system for controlling same.

Related Art

A cooker hood is an electric appliance in a kitchen for cleaning an environment in the kitchen. The cooker hood can rapidly discharge waste generated when a fire burns in a stove and lampblack that is generated during a cooking process and that is harmful to human bodies, to clean the air, and has safety assurance functions of anti-poison and anti-explosion.

With the development of various social networks, a user hopes that a process of cooking by himself or herself in a kitchen can be recorded. After cooking, the user can edit the cooking process by using a text, produce a menu by using the text and a corresponding image, and then share the menu on a corresponding social network.

In an existing menu production process, a user usually records a cooking process by using a device such as a mobile phone or a camera. The user needs to hold the device such as a mobile phone or a camera while cooking. Therefore, user operations are quite inconvenient, causing relatively difficult menu production.

SUMMARY

A problem to be resolved in embodiments of the present invention is how to simplify user operations during a menu production process.

To resolve the foregoing problem, the present invention provides a method for controlling a cooker hood, characterized in that, an image collection apparatus is disposed on the cooker hood, and the method includes: when a menu production start instruction is received, controlling the image collection apparatus to perform an image collection operation; storing a collected image; and after a menu production end instruction is received, invoking the collected image, to generate a corresponding menu.

Optionally, the controlling the image collection apparatus to perform an image collection operation includes: controlling a plurality of cameras disposed on a housing of the cooker hood to perform an image collection operation on a corresponding image collection area.

Optionally, the image collection operation includes at least one of the following: performing image collection by means of video shooting; performing image collection by means of photographing; or performing image collection by means of video snapshot.

Optionally, the image collection operation further includes: performing a sound collection operation by using a microphone disposed on the cooker hood.

Optionally, the storing a collected image includes: transmitting stored information to a cloud server and storing the information in the cloud server.

Optionally, the method further includes: obtaining a speech or text description part corresponding to the collected image by using a human-machine interaction interface of the cooker hood or by logging in to the cloud server; and the invoking the collected image, to generate a corresponding menu includes: making the collected image correspond to the obtained speech or text description part, to generate the corresponding menu.

Optionally, the human-machine interaction interface is a touchable projection surface.

Optionally, the method further includes at least one of the following: when an instruction of sharing or downloading the menu is received, inputting corresponding information by using a reminder; and when an instruction of determining to perform the sharing or downloading operation is received, performing a corresponding operation on the menu; or when an editing instruction of editing the menu is received, controlling the menu to be in an editable state, so as to receive an input editing operation.

An embodiment of the present invention further provides a system for controlling a cooker hood, the system including: a cooker hood body; an image collection apparatus and a controller that are disposed on the cooker hood body; a memory coupled to the controller; and a generation apparatus coupled to the memory, where the controller is coupled to the image collection apparatus, and configured to: when a menu production start instruction is received, control the image collection apparatus to perform an image collection operation; the memory is configured to store a collected image; and the generation apparatus is configured to: after a menu production end instruction is received, invoke the collected image, to generate a corresponding menu.

Optionally, the image collection apparatus includes: a plurality of cameras disposed on a housing of the cooker hood body, and the plurality of cameras corresponds to at least one image collection area.

Optionally, the image collection operation includes at least one of the following: performing image collection by means of video shooting; performing image collection by means of photographing; or performing image collection by means of video snapshot.

Optionally, the image collection apparatus further includes: a microphone disposed on the cooker hood body.

Optionally, the controller is configured to transmit collected information to a cloud server and store the information in the cloud server.

Optionally, the system further includes: an input apparatus disposed on the cooker hood body and coupled to the generation apparatus, where the input apparatus is configured to obtain a speech or text description part corresponding to the collected image by using a human-machine interaction interface of the cooker hood or by logging in to the cloud server, where the generation apparatus is configured to make the collected image correspond to the obtained speech or text description part, to generate the corresponding menu.

Optionally, the human-machine interaction interface is a touchable projection surface.

Optionally, the generation apparatus includes at least one of the following: a first execution unit, configured to: when an instruction of sharing or downloading the menu is received, input corresponding information by using a reminder; and when an instruction of determining to perform the sharing or downloading operation is received, perform a corresponding operation on the menu; or a second execution unit, configured to: when an editing instruction of editing the menu is received, control the menu to be in an editable state, so as to receive an input editing operation.

An embodiment of the present invention further provides a cooker hood, the cooker hood including: a cooker hood body, and an image collection apparatus, a controller, a memory, and a generation apparatus that are disposed on the cooker hood body, where the controller is coupled to the image collection apparatus, and configured to: when a menu production start instruction is received, control the image collection apparatus to perform an image collection operation; the controller is coupled to the image collection apparatus, and configured to: when a menu production start instruction is received, control the image collection apparatus to perform an image collection operation; the memory is coupled to the controller, and configured to store a collected image; and the generation apparatus is coupled to the memory, and configured to: after a menu production end instruction is received, invoke the collected image, to generate a corresponding menu.

Compared with the prior art, the technical solutions of the present invention have the following advantage:

By means of the foregoing solutions, the image collection apparatus is disposed on the cooker hood, so as to control, when a menu production start instruction is received, the image collection apparatus to perform an image collection operation and store an image. Compared with that a user holds a device such as a mobile phone and a camera to record a cooking process, user operations during a menu production process can be simplified, therefore it is convenient to produce a menu.

DETAILED DESCRIPTION

Figure 1:
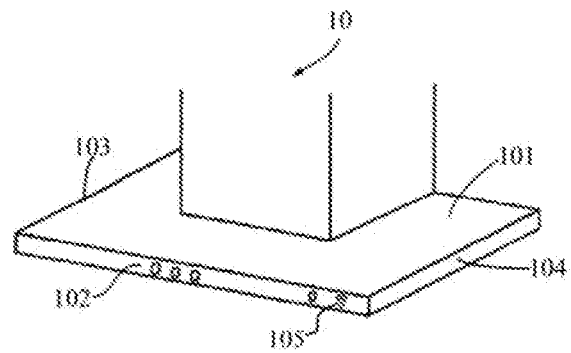
FIG. 1 is a schematic structural diagram of a cooker hood in the prior art.

FIG. 1 is a schematic diagram of an existing cooker hood. Referring to FIG. 1, the cooker hood 10 may include a cooker hood body 101. A motor (not shown) is installed in the cooker hood body 101. The motor can drive an impeller (not shown) to rotate, to discharge lampblack generated during a cooking process to the outdoor. Several operation buttons are usually disposed on a surface 102 of the cooker hood body 101 that faces a user, for example, a turn-on/turn-off button for the cooker hood and a turn-on/turn-off button for a lamp.

In an existing menu production process, a user usually records a cooking process by using a device such as a mobile phone or a camera. The user needs to hold the device such as a mobile phone or a camera while cooking. Therefore, user operations are quite inconvenient, causing relatively difficult menu production.

To resolve the foregoing problem, an embodiment of the present invention provides a method for controlling a cooker hood. An image collection apparatus is disposed on the cooker hood, so as to control, when a menu production start instruction is received, the image collection apparatus to perform an image collection operation and store an image. Compared with that a user holds a device such as a mobile phone and a camera to record a cooking process, user operations during a menu production process can be simplified, therefore it is convenient to produce a menu.

To make the foregoing objectives, features, and advantages of the present invention more comprehensible, the specific embodiments of the present invention are described in detail with reference to the accompanying drawings.

Figure 2:
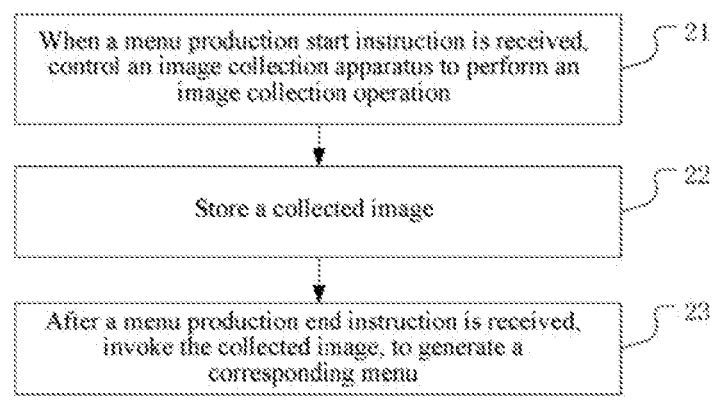
FIG. 2 is a flowchart of a method for controlling a cooker hood according to an embodiment of the present invention.

Referring to FIG. 2, an embodiment of the present invention provides a method for controlling a cooker hood. An image collection apparatus is disposed on the cooker hood. The method may include:

Step 21: When a menu production start instruction is received, control the image collection apparatus to perform an image collection operation.

In a specific implementation, the menu production start instruction may be received in a plurality of manners.

In an embodiment of the present invention, the menu production instruction may be received by means of a human-machine interaction interface disposed on the cooker hood. The human-machine interaction interface may be a touchable interface disposed on the cooker hood, may be a touchable projection surface generated based on a projection control function of the cooker hood, may be an operation button disposed on the cooker hood, or the like.

In another embodiment of the present invention, the menu production start instruction may be received by means of remote communication. For example, the cooker hood may be bound to a terminal device such as a mobile phone of a user, and the menu production start instruction is sent to the cooker hood by using the terminal device such as a mobile phone.

When the menu production start instruction is received, a corresponding control signal may be sent to the image collection apparatus, to control the image collection apparatus to perform an image collection operation. The control signal may be an analog signal, such as a current signal or a voltage signal, or may be a digital signal, where a high level and a low level are used for distinction.

In an embodiment of the present invention, the image collection apparatus may include a plurality of cameras disposed on a housing of the cooker hood, where the one or more cameras may correspond to an image collection area. For example, referring to FIG. 1, cameras may be respectively installed on surfaces 102, 103, and 104 of the cooker hood 10. A video shooting range of each camera is an image collection area camera of the camera.

After starting menu production, a user may prepare food materials and cook in a selected image collection area. The image collection area selected by the user may be an image collection area set by default, or may be an image collection area preselected by the user by means of the menu production start instruction or in another manner. This is not specifically limited.

In a specific implementation, the image collection apparatus may perform one or more image collection operations. This is not specifically limited.

For example, the image collection apparatus may perform image collection by means of video shooting, that is, recording a cooking process.

To reduce storage space occupied by a collected image, the image collection apparatus may alternatively perform image collection by means of photographing. The user may set an interval for photographing by means of the human-machine interaction interface on the cooker hood.

To comprehensively collect image information and save storage space to some extent, the image collection apparatus may alternatively perform image collection by means of video snapshot.

It may be understood that, any specific manner in which the image collection apparatus performs an image collection operation does not constitute a limitation to the present invention, and falls within the protection scope of the present invention.

In another embodiment of the present invention, the image collection apparatus may further include a microphone disposed on the cooker hood. A sound collection operation is performed by means of the microphone disposed on the cooker hood.

A quantity of the microphone is not limited. For example, only one microphone may be disposed on the cooker hood, and the microphone may collect sound information in all image collection areas; or a plurality of microphones may be disposed, and each microphone may collect sound information in one or more image collection areas.

In a specific implementation, the microphone may have a noise reduction function, that is, may perform noise reduction on collected sound information, to improve quality of a collected image.

Step 22: Store a collected image.

In a specific implementation, the collected image may be stored in a plurality of manners. For example, the cooker hood may have some storage space. When storage space occupied by the collected image information is relatively small, may the storage space of the cooker hood itself may be used for storage. Alternatively, a corresponding data interface may be disposed on the cooker hood, and the cooker hood may be connected to another storage device outside such as a removable hard disk by means of the data interface. Referring to FIG. 1, a wireless communications apparatus 105 may further be disposed on the cooker hood body 10. Stored information is transmitted and stored in a cloud server by means of the wireless communications apparatus 105, to save storage space of the cooker hood and reduce a hardware overhead.

In a specific implementation, to save storage space, video compression may be first performed on the collected image, and then the collected image is stored. Alternatively, after video compression is performed on the collected image, resource transmission is performed, to save transmission resources.

Step 23: after a menu production end instruction is received, invoke the collected image, to generate a corresponding menu.

In a specific implementation, the menu production end instruction may be received in a plurality of manners. Specifically, reference may be made to the foregoing description of how to receive the menu production start instruction, and details are not described herein again.

After the menu production end instruction is received, the collected image may be invoked from a storage medium.

When the image collection apparatus includes only a camera, the generated menu includes only image information, and does not include sound information. When the image collection apparatus also includes a microphone, the generated menu includes both image information and sound information.

Figure 3:
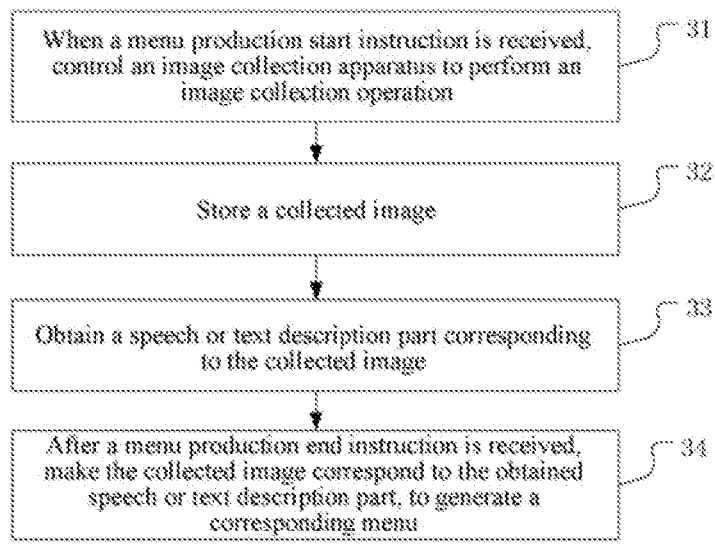
FIG. 3 is a flowchart of another method for controlling a cooker hood according to an embodiment of the present invention.

FIG. 3 is another method for controlling a cooker hood according to an embodiment of the present invention. Compared with the embodiment in FIG. 1, in this embodiment, a menu generated by using the method for controlling the cooker hood further includes a speech or text description part corresponding to a collected image.

Specifically, the method may include the following steps:

Step 31: When a menu production start instruction is received, control the image collection apparatus to perform an image collection operation.

Step 32: Store a collected image.

For steps 31 and 32, specifically, refer to the foregoing description of steps 21 and 22 respectively, and details are not described herein again.

Step 33: Obtain a speech or text description part corresponding to the collected image.

In a specific implementation, the speech or text description part corresponding to the collected image may be obtained in a plurality of manners. A specific manner may be selected according to a storage address of the collected image. It may be understood that, any manner in which the speech or text description part corresponding to the collected image is obtained does not constitute a limitation to the present invention, and falls within the protection scope of the present invention.

For example, the speech or text description part corresponding to the collected image may be input by means of a human-machine interaction interface of the cooker hood. The human-machine interaction interface may be a touchable interface disposed on the cooker hood, may be a touchable projection surface generated based on a projection control function of the cooker hood, may be an operation button disposed on the cooker hood, or the like.

When the collected image is stored in a cloud server, the speech or text description part corresponding to the collected image input by means of the human-machine interaction interface of the cooker hood may be transmitted to the cloud server, or the speech or text description part corresponding to the collected image may be input by directly logging in to the cloud server.

In a specific implementation, when the speech or text description part corresponding to the collected image is obtained by using the cloud server or the human-machine interaction interface of the cooker hood, one or more menu templates may be provided in advance by using the cloud server or the human-machine interaction interface of the cooker hood. A user may select a corresponding menu template to input the speech or text description part corresponding to the collected image, so that it is convenient to produce a menu. Certainly, the user may alternatively customize the speech or text description part corresponding to the collected image, instead of depending on the provided menu template.

In a specific implementation, step 33 may be performed after the menu production start instruction is received, or after step 32 is perform, or after step 31 is perform. A specific time point at which step 33 is performed does not constitute a limitation to the present invention, as long as the speech or text description part corresponding to the collected image is obtained before a menu is generated.

Step 34: After a menu production end instruction is received, make the collected image correspond to the obtained speech or text description part, to generate a corresponding menu.

For example, a speech or text description part about a stage of a cooking process may be added to an image representing the stage of the cooking process, to generate a corresponding menu. In this case, the generated menu includes both the image and the speech or text description part.

In a specific implementation, a user may perform operations such as sharing, downloading, and editing on a generated menu, to meet a social requirement of the user and improve user experience, so that the user has more fun during a cooking process. The following describes in detail how to perform the operations such as sharing, downloading, and editing.

In an embodiment of the present invention, the method for controlling the cooker hood may include: when an instruction of sharing or downloading the menu is received, inputting corresponding information by using a reminder; and when an instruction of determining to perform the sharing or downloading operation is received, performing a corresponding operation on the menu.

Specifically, when a sharing instruction of sharing the menu is received, an instruction of selecting an target social network application may be input by using a reminder. When an instruction of submitting sharing information is received, the menu is shared on the input target social network application. The target social network application may include: QQ, WeChat, microblog, and the like. Before the notification is used for inputting the instruction of selecting a target social network application, a plurality of social network application options may be provided to the user, so that the user selects a social network application from the provided plurality of social network application options, as a target social network application.

When a downloading instruction of downloading the menu is received, a target downloading address may be input by using a reminder. When an instruction of determining to perform the downloading operation is received, the menu is sent to the input target downloading address. The target downloading address may be a storage address of storage space of the cooker hood itself, or may be a storage address of a storage device outside such as a removable hard disk connected to the cooker hood by means of a data interface.

In another embodiment of the present invention, the method for controlling the cooker hood may include: when an editing instruction of editing the menu is received, controlling the menu to be in an editable state, to receive an input editing operation. The editing operation includes: modification, deletion, addition, and the like. A requirement of a user on a menu form can be met by controlling the menu to be in an editable state.

It can be learned from the foregoing content that, by means of the method for controlling the cooker hood in this embodiment of the present invention, not only operations of recording a cooking process by a user can be simplified, and menu production difficulty is reduced, but also user experience can be improved, so that the user has more fun in the cooking process.

To make a person skilled in the art better understand and implement this embodiment of the present invention, the following describes in detail the cooker hood corresponding to the foregoing method for controlling a cooker hood.

Figure 4:
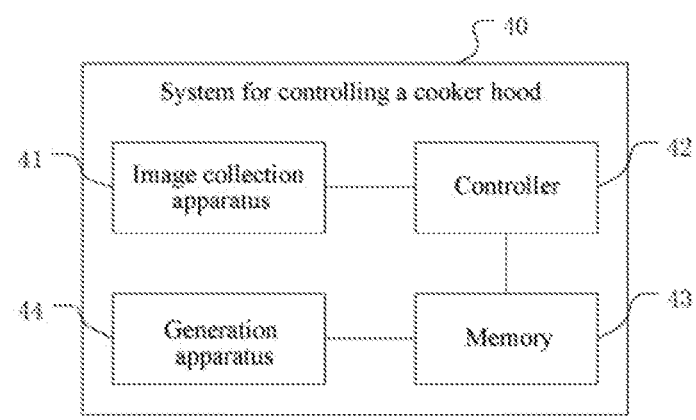
FIG. 4 is a schematic structural diagram of a system for controlling a cooker hood according to an embodiment of the present invention.

Referring to FIG. 4, an embodiment of the present invention provides a system 40 for controlling a cooker hood. The system 40 for controlling a cooker hood may include: a cooker hood body (not shown); an image collection apparatus 41 and a controller 42 that are disposed on the cooker hood body; a memory 43 coupled to the controller 42; and a generation apparatus 44 coupled to the memory 43.

The controller 42 is coupled to the image collection apparatus 41, and configured to: when a menu production start instruction is received, control the image collection apparatus 41 to perform an image collection operation.

The memory 43 is configured to store a collected image.

The generation apparatus 44 is configured to: after a menu production end instruction is received, invoke the collected image, to generate a corresponding menu.

In a specific implementation, the image collection apparatus 41 may include: a plurality of cameras (not shown) disposed on a housing of the cooker hood body, and the plurality of cameras corresponds to at least one image collection area. A quantity of the image collection areas is not limited. One or more cameras may be correspondingly disposed in each image collection area.

In a specific implementation, the controller 42 may control the image collection apparatus 41 to perform image collection by means of video shooting, or perform image collection by means of photographing, or perform image collection by means of video snapshot, and may further control the image collection apparatus 41 to perform two or more image collection operations at the same time.

In an embodiment of the present invention, the image collection apparatus 41 may further include: a microphone (not shown) disposed on the cooker hood body. The microphone may be configured only to collect sound information in an image collection area, or may further be configured to perform noise reduction on the collected sound information, to improve quality of the collected sound.

In an embodiment of the present invention, the memory 43 may be disposed on the cooker hood body, that is, corresponding storage space may be set in the cooker hood body to store the collected image. In this case, the generation apparatus 44 may be disposed on the cooker hood body, and is coupled to the memory 43, to generate a corresponding menu by invoking the image stored in the memory 43. Certainly, the generation apparatus 44 may alternatively be disposed outside (not shown) the cooker hood body, as long as a corresponding menu can be generated by invoking the image stored in the memory 43.

Figure 5:
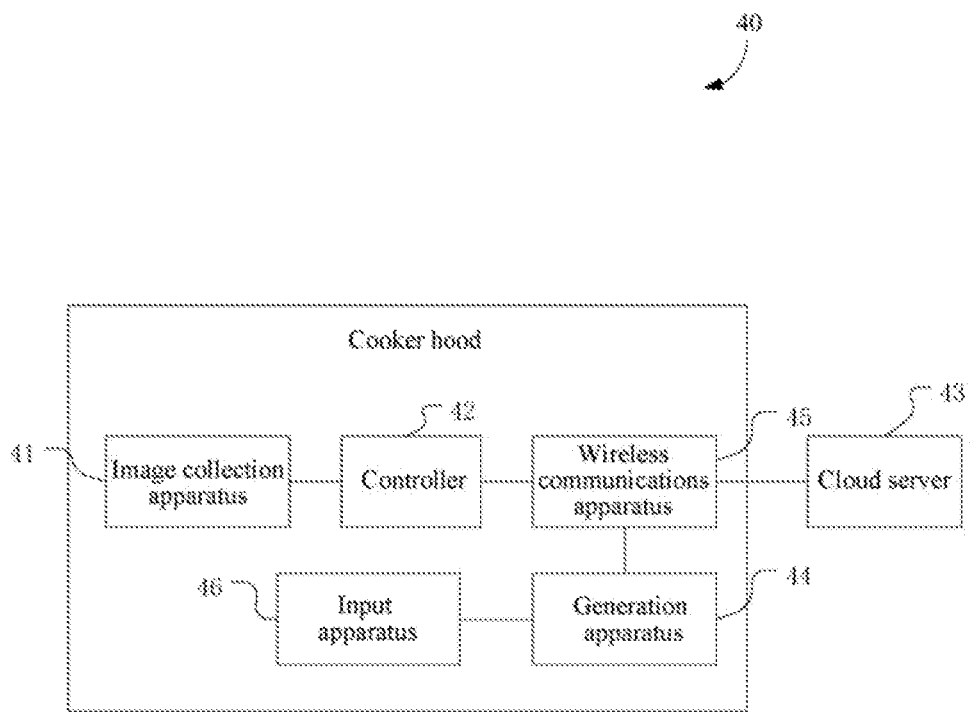
FIG. 5 is a schematic structural diagram of another system for controlling a cooker hood according to an embodiment of the present invention.

Referring to FIG. 5, in another embodiment of the present invention, the memory 43 may be disposed outside the cooker hood body.

Specifically, the system 40 for controlling a cooker hood may further include: a wireless communications apparatus 45 disposed on the cooker hood body. The controller 42 may be coupled to the wireless communications apparatus 45, so as to transmit information collected by the image collection apparatus 41 by using the wireless communications apparatus 45 to a cloud server and store the information in the cloud server. In this case, the cloud server is used as the memory 43 to store the collected image.

Correspondingly, the generation apparatus 44 may be disposed on the cooker hood body, and is coupled to the wireless communications apparatus 45, so as to invoke the image stored in the cloud server 43 by using the wireless communications apparatus 45 to generate a corresponding menu. The generation apparatus 44 may alternatively be disposed on the cloud server 43 (not shown). After the cloud server 43 stores the collected image, the image stored in the cloud server 43 is directly invoked to generate a corresponding menu. The generation apparatus 44 may alternatively be disposed outside the cloud server 43 and the cooker hood, and is coupled to the cloud server 43, so as to invoke the image stored in the cloud server 43 to generate a corresponding menu. In an embodiment of the present invention, referring to FIG. 5, the system 40 for controlling a cooker hood may further include an input apparatus 46 disposed on the cooker hood body and coupled to the generation apparatus 44. The input apparatus 46 is configured to obtain a speech or text description part corresponding to the collected image. Correspondingly, the generation apparatus 44 is configured to make the collected image correspond to the obtained speech or text description part, to generate a corresponding menu.

In a specific implementation, the input apparatus 46 may be a human-machine interaction interface or a cloud server disposed on the cooker hood body. That is, a user may input the speech or text description part corresponding to the collected image by using the human-machine interaction interface on the cooker hood body, or may input the speech or text description part corresponding to the collected image by logging in to the cloud server.

In an embodiment of the present invention, the cooker hood has a projection controlling function. By means of the function, a touchable surface may be projected to a location such as a surface of a cooking bench used in cooperation with the cooker hood. In addition, a sensing apparatus (not shown), such as an infrared camera, is also disposed on the cooker hood body. The sensing apparatus may be configured to sense information of a user operation on a projection surface, and the information is used as the speech or text description part corresponding to the collected image.

In a specific implementation, the input apparatus 46 may further provide one or more menu templates to the user, and the user may input the speech or text description part corresponding to the collected image in the template, so that menu production is more convenient. Certainly, the user may alternatively customize the speech or text description part corresponding to the collected image, instead of depending on the provided menu template.

In a specific implementation, a data interface (not shown) may be disposed on the cooker hood body. By means of the data interface, a menu generated by the generation apparatus 44 may be exported to a storage medium such as a removable hard disk outside connected to the cooker hood body.

In an embodiment of the present invention, the generation apparatus 44 may include a first execution unit (not shown). The first execution unit is configured to: when an instruction of sharing or downloading the menu is received, input corresponding information by using a reminder; and when an instruction of determining to perform the sharing or downloading operation is received, perform a corresponding operation on the menu.

Specifically, when a sharing instruction of sharing the menu is received, the first execution unit may input, by using a reminder, an instruction of selecting a target social network application. When an instruction of submitting sharing information is received, the menu is shared on the input target social network application. When a downloading instruction of downloading the menu is received, the first execution unit may input a target downloading address by using a reminder. When an instruction of determining to perform the downloading operation is received, the menu is sent to the input target downloading address.

In another embodiment of the present invention, the generation apparatus 44 may include a second execution unit (not shown). The second execution unit is configured to: when an editing instruction of editing the menu is received, control the menu to be in an editable state, so as to receive an input editing operation.

In still another embodiment of the present invention, the generation apparatus 44 may include both the first execution unit and the second execution unit, that is, may perform operations such as sharing, downloading, and editing on the menu, to meet a social requirement of the user, and improve user experience.

An embodiment of the present invention further provides a cooker hood. The cooker hood may include: a cooker hood body; an image collection apparatus 41, a controller 42, a memory 43, and a generation apparatus 44 that are disposed on the cooker hood body. For the image collection apparatus 41, the controller 42, the memory 43, and the generation apparatus 44, specifically, refer to corresponding descriptions in the foregoing system 40 for controlling a cooker hood respectively, and details are not described herein again.

It can be learned from the foregoing content that, by means of the cooker hood in this embodiment of the present invention, not only operations of recording a cooking process by a user can be simplified, and menu production difficulty is reduced, but also a generated menu can be shared, downloaded, edited, and the like, so as to meet a social requirement of the user, to improve user experience.

A person of ordinary skill in the art may understand that all or some of the steps of the methods in the embodiments may be implemented by a program instructing relevant hardware. The program may be stored in a computer readable storage medium. The storage medium may include: a ROM, a RAM, a magnetic disk, or an optical disc.

Although the present invention is disclosed as above, the present invention is not limited thereto. A person skilled in the art can make various alterations or modifications without departing from the spirit and the scope of the present invention. Therefore, the protection scope of the present invention should be subject to the scope limited by the claims.

What is claimed is:

1. A method for controlling a cooker hood, the method comprising:
   controlling an image collection apparatus disposed on the cooker hood to perform an image collection operation, when an image collection instruction is received;
   storing a collected image obtained by the image collection apparatus in the image collection operation;
   obtaining a speech or text description part using a human-machine interface of the cooker hood, after the image collection operation;
   in response to a generation instruction, correlating the collected image to the obtained speech or text description part to generate a corresponding menu; and
   in response to a sharing instruction, performing a sharing operation on the corresponding menu.

2. The method of claim 1, wherein the image collection apparatus is controlled by controlling a plurality of cameras disposed on a housing of the cooker hood to perform the image collection operation on a corresponding image collection area.

3. The method of claim 1, wherein the image collection operation to perform an image collection comprises at least one process selected from the group consisting of video shooting, photographing, and video snapshot.

4. The method of claim 1, wherein the image collection operation to perform an image collection comprises a sound collection operation by using a microphone disposed on the cooker hood.

5. The method of claim 1, wherein the collected image is stored by transmitting stored information to a cloud server and storing the information in the cloud server.

6. The method of claim 5, further comprising:
in response to a template list instruction, obtaining a list of prerecorded text or speech description parts from the cloud server; and
in response to a template choice instruction, correlating the collected image to a prerecorded speech or text description part from the list of prerecorded text or speech description parts, to generate a corresponding menu.

7. The method of claim 1, wherein the human-machine interface is a touchable projection surface.

8. The method of claim 1, further comprising:
when the sharing instruction is received, inputting corresponding information by using a reminder.

9. The method of claim 1, further comprising:
in response to a downloading instruction, performing a downloading operation on the corresponding menu.

10. The method of claim 1, further comprising:
in response to an editing instruction, controlling the corresponding menu to be in an editable state, so as to receive an input editing operation.

11. A system for controlling a cooker hood, comprising:
a cooker hood body;
an image collection apparatus disposed on the cooker hood body;
a controller disposed on the cooker hood body and coupled to the image collection apparatus, the controller being configured to control the image collection apparatus to perform an image collection operation when a menu production start instruction is received;
a memory coupled to the controller and configured to store a collected image; and
an input apparatus disposed on the cooker hood body and coupled to a generation apparatus, the input apparatus being configured to obtain a speech or text description part corresponding to the collected image by using a human-machine interface of the cooker hood, the generation apparatus being configured to make the collected image correspond to the obtained speech or text description part so as to generate a corresponding menu.

12. The system of claim 11, wherein the image collection apparatus comprises a plurality of cameras disposed on a housing of the cooker hood body, said plurality of cameras corresponding to at least one image collection area.

13. The system of claim 11, wherein the image collection operation to perform an image collection comprises at least one process selected from the group consisting of video shooting, photographing, and video snapshot.

14. The system of claim 11, wherein the image collection apparatus comprises a microphone disposed on the cooker hood body.

15. The system of claim 11, wherein the controller is configured to transmit collected information to a cloud server and store the information in the cloud server.

16. The system of claim 11, wherein the human-machine interaction interface is a touchable projection surface.

17. The system of claim 11, wherein the generation apparatus comprises at least one member selected from the group consisting of a first execution unit configured to input an instruction of sharing or downloading the menu when an instruction of sharing or downloading the menu is received, and a second execution unit configured to control the corresponding menu to be in an editable state, so as to receive an input editing operation when an editing instruction is received.

18. The system of claim 11, wherein the generation apparatus comprises at least one member selected from the group consisting of a first execution unit configured to input an instruction of sharing or downloading the menu when an instruction of sharing or downloading the menu is received, and a second execution unit configured to control the corresponding menu to be in an editable state, so as to receive an input editing operation when an editing instruction is received, and a third execution unit configured to combine the corresponding menu to a template with a prerecorded speech or text when a template instruction is received.

19. A cooker hood, comprising:
a cooker hood body;
an image collection apparatus disposed on the cooker hood body;
a controller disposed on the cooker hood body and coupled to the image collection apparatus, the controller being configured to control the image collection apparatus to perform an image collection operation when a menu production start instruction is received;
a memory coupled to the image collection apparatus and configured to store a collected image; and
an input apparatus disposed on the cooker hood body and coupled to a generation apparatus, the input apparatus being configured to obtain a speech or text description part corresponding to the collected image by using a human-machine interface of the cooker hood, the generation apparatus being configured to make the collected image correspond to the obtained speech or text description part so as to generate a corresponding menu.

* * * * *